Jan. 30, 1962 T. SNEDDON 3,018,515
MANUFACTURE OF PLASTIC SHEETS
Filed Dec. 16, 1958 3 Sheets-Sheet 1
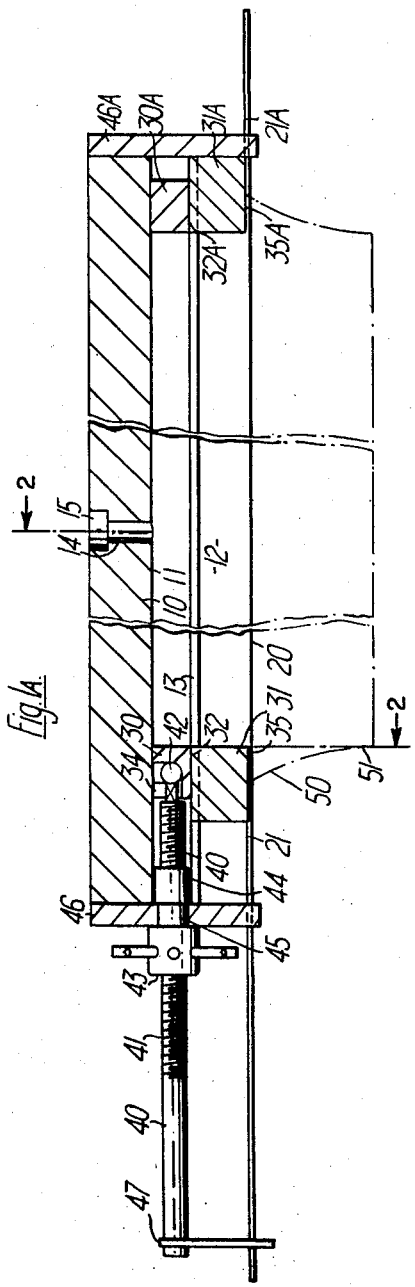
Inventor
THOMAS SNEDDON
By Irwin S. Thompson
Attorney Jan. 30, 1962 T. SNEDDON 3,018,515
MANUFACTURE OF PLASTIC SHEETS
Filed Dec. 16, 1958 3 Sheets-Sheet 2
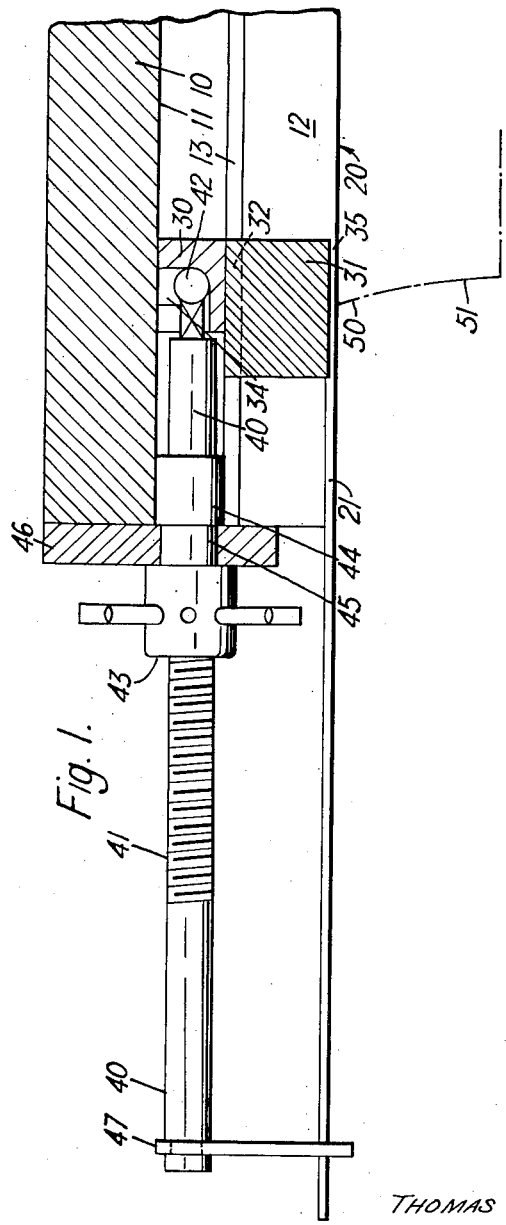
Inventor
THOMAS SNEDDON
By Irwin S. Thompson
Attorney Jan. 30, 1962 T. SNEDDON 3,018,515
MANUFACTURE OF PLASTIC SHEETS
Filed Dec. 16, 1958
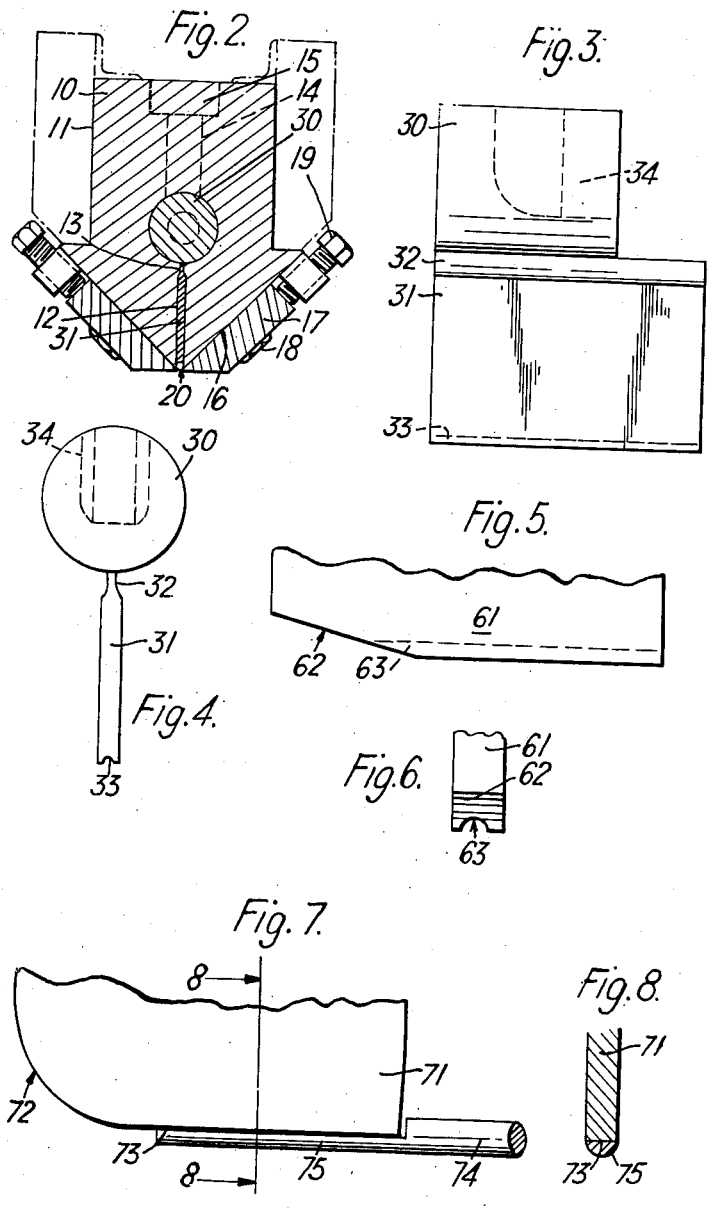
Inventor
THOMAS SNEDDON
By
Attorney

United States Patent Office 3,018,515
Patented Jan. 30, 1962

3,018,515
MANUFACTURE OF PLASTIC SHEETS
Thomas Sneddon, East Kilbride, Scotland, assignor to Clyde Paper Company Limited, Rutherglen, Great Britain, a British company
Filed Dec. 16, 1958, Ser. No. 780,779
Claims priority, application Great Britain Dec. 23, 1957
8 Claims. (Cl. 18—12)

This invention relates to the manufacture of plastic sheets by an extrusion method of the type in which plastic in a molten condition is extruded downwards through a die made with a long narrow slit, the mouth of the slit being defined by a pair of jaws.

More especially, although not exclusively, the invention is applicable to the extrusion of polythene (i.e. polyethylene) as a fine hot sheet for immediate application as a coating to a sheet of paper.

The extrusion of polythene by the stated type of method has hitherto been subject to a serious practical disadvantage, namely, as the sheet being extruded hangs in suspension from the jaws of the die, it contracts inwards at both edges and forms there a slight accumulation of the molten polythene. This accumulation results in thickened margins in the solidified sheet. These margins preclude crease-free winding of a coated paper and have other drawbacks, so much so that it is customary to trim off the margins as a step in the manufacture of the coated paper. Seeing that the margins are each about an inch to an inch-and-half wide, there is an appreciable loss of material.

In the conception of the present invention it has been ascertained that if an end of the die slit is blocked to a short extent widthwise of the plastic sheet being extruded and the fine inter-jaw space is left open underneath the blockage, molten plastic will flow into this space and will form itself into an attenuated margin which in the solidified plastic has practically the same thickness as the remainder of the sheet.

It is preferable to limit the widthwise extent of the inter-jaw space in order to give a more definite linear formation at the edge of the sheet.

In order that the invention can be clearly understood reference will be made to the accompanying drawings which show apparatus by which the extrusion method can be performed and examples of a blockage device for the purpose of the present invention. In the drawings, FIG. 1 is a longitudinal section of one end of an extrusion die incorporating an example of the blockage device and FIG. 2 is a corresponding cross-section along the lines 2—2 of FIG. 1A. FIG. 1A is a view similar to FIG. 1 but drawn to a smaller scale and showing both ends of the extrusion die. FIGS. 3 and 4 are views at right angles to one another of the blockage device itself, drawn to a larger scale than FIGS. 1 and 2 and FIG. 3 being viewed in the opposite direction to FIG. 1. FIGS. 5 and 6 are fragmentary views corresponding to FIGS. 3 and 4 but showing another example of the blockage device. FIG. 7 is a view corresponding to FIGS. 3 and 5 but showing yet an other example, and FIG. 8 is a section on the line 8—8 of FIG. 7.

The die shown in FIGS. 1 and 2 consists of an electrically heated block 10 which is solid except for a cylindrical channel 11 extending through the block from end to end and a slit 12 extending from the bottom of the channel to the mouth of the die. The slit is defined by deep side walls formed by the opposite sides of the block 10 and, as shown by FIG. 2, the surfaces of the walls are parallel, except where the slit joins into the channel by way of a neck 13 which acts like a nozzle. The die is formed, mid-way of its length, with a hole 14 (FIG. 2) which receives the plastic material under pressure from an inlet 15. The underside of the block 10 has inclined faces 16 of inverted gable form. These faces converge downwards to form an apex into which the bottom of the slit 12 opens.

The die includes a pair of jaws 17 which are slidably fitted against the faces 16. These blocks are secured in a position of adjustment by pin-and-slot devices; the heads of the screwed pins of two of these devices are indicated by 18. The block 10 is provided with screws 19 which bear against the jaws 17 and which can be manipulated in co-operation with the pins 18 to adjust the positions of the jaws 17. These jaws, at their adjacent tips, define where indicated by 20 the mouth of the die.

At both ends of the die mouth there are closure wires, one of which is shown in FIG. 1, being indicated by 21. This wire fits along the bottom of the slit 12, resting upon the tips of the jaws 17.

The parts so far described are customary in the apparatus for performing the extrusion method. Ordinarily, the cylindrical channel 11 and slit 12 would be closed at their ends by appropriate closure plates and the wires would define the ends of the die mouth.

In accordance with the present invention, the apparatus has incorporated in it, at each end of the die, a blockage device. This device at the end shown in FIG. 1 consists of a cylindrical head 30 with a depending fin 31 which joins into the head at a narrowed neck 32. The bottom of the fin 31 is formed wiht a semi-cylindrical groove 33 which is a neat fit upon the wire 21. The head 30 has a slot formation 34 in its upper end. The head 30, fin 31 and neck 32 form a precise sliding fit in the channel 11, slit 12 and neck 13. The fit is such that these parts present a flat face, FIGS. 3 and 4, forming a complete end closure to the channel slit and neck except at the fine inter-jaw space indicated by 35, FIG. 1, underneath the fin 31, which space projects laterally beyond the adjacent end of the slit 12. The wire 21 defines the end of the space 35.

In the example, the blockage device at the end shown in FIG. 1 is provided with means for adjusting it lengthwise of the die. The means shown include a rod 40 having a screwed portion 41 and a terminal key 42, which fits into the slot formation 34 in the cylindrical head 30. The key 42, by reason of its engagement with the formation 34, holds the rod 40 against rotation. The adjustment means also includes a nut-like component which consists of a hand-turnable nut 43, a collar 44 and a journal 45, the nut being in engagement with the screw 41. The adjustment means also includes an anchorage plate 46 which is secured to the adjacent end of the block 10 and which forms a bearing for the journal 45. The arrangement is such that, when the axially stationary nut 43 is turned, the non-rotatable rod 40 is displaced axially so that the blockage device 30—34 is displaced lengthwise of the die.

The rod 40 has a connection 47 with the outer end of the wire 21, so that when the blockage device is adjusted the wire 21 is adjusted in unison with it.

Although a blockage device with adjusting means 40—47 may be provided at each end of the extrusion die, adjusting means may instead be provided only at one side of the apparatus, as indicated by FIG. 1A. As therein shown, the blockage device at the end opposite to the adjustable blockage device has no adjusting means. Instead, the cylindrical head 30A with its depending fin 31A and neck 32A is a non-adjustable fixture forming a complete end closure to the channel slit except at the fine inter-jaw space 35A. The anchorage plate 46A carries the wire 21A which serves as a closure to the space 35A.

When the apparatus is in use, the extruded sheet passes from the die in a form somewhat as indicated by the dash-dot line 50, 51, in FIG. 1 and FIG. 1A, indicating the edge of the sheet. The sheet curves inwards at 50 from the limit of the spaces 35 and 35A defined by the wires 21 and 21A; it is found that when the sheet has contracted to its final width, as indicated by 51, the margin has practically the same thickness as the remainder of the sheet.

In the application of the invention to the manufacture of polythene-coated paper, as usual the paper is led from a reel to a rubber-cover roll which forms a nip with a water-cooled roll. The hot molten sheet of polythene (it leaves the die at nearly 600° F.) meets the paper immediately before the nip, where they become united in a single laminated sheet. This sheet is led to drum winding equipment (the customary circular edge-trimming knives being omitted).

It will be apparent that the apparatus can be used in the manufacture of sheets composed solely of polythene or equivalent extrudable plastic and the manufacture of coated sheet materials other than paper.

The optimum dimensions of the fine spaces 35 and 35A can be determined by trial-and-error procedure in accordance with the conditions, such as the nature, temperature and pressure of the plastic and the thickness of the sheet. The setting of the inner end of the wires 21 and 21A relative to the fins 31, 31A determines the ultimate thickness of the margin of the sheet; if the setting leaves too short a space, the margin will be too thick. Thus, the wire 21 can be set with its inner end at a selected distance from the inner edge of the fin 31 to suit the conditions involved in the production of any specific plastic sheet.

It is not essential to provide the groove 33 and the adjustable wire if the length of the space 35 can be predetermined. In this event, the bottom of the fin 31 may be formed at its outer portion to close the inter-jaw gap and at its inner portion with a long fine recess providing the space 35.

It has been found advantageous, under certain conditions, to provide the space 35 with an opening entrance, so that the molten plastic sheet entering the mouth is given guidance and increases in width progressively as it becomes attenuated widthwise from the slit 12 into the space 35. Thus, as FIGS. 5 and 6 show, the fin 61 is formed with an inclined bottom guide surface 62 which serves as such an entrance for the groove 63 of semi-cylindrical cross-section. In the example according to FIGS. 7 and 8, the fin 71 is formed with an arcuate bottom guide surface 72 which also serves as an entrance; when entering, the molten plastic sheet is guided to widen gradually. In this example, the bottom 73 of the fin is flat (i.e. no groove is formed) and the wire 74 is recessed so that its end portion 75 is semi-cylindrical in cross-section, presenting a flat upper surface which comes against the flat bottom.

The construction of the blockage device according to FIGS. 1 to 4 and FIG. 1A is generally useful for varying thicknesses of sheets especially under high temperature conditions. However, under lower temperature conditions with higher viscosity of the molten plastic the modified construction according to FIGS. 5 and 6 is more satisfactory; and under such conditions the construction according to FIGS. 7 and 8 is preferable in extruders of smaller size.

The die may be required to produce plastic sheets of fixed width. In this event, the blockage device may be a part of a closure fixture on each end of the die. Such a blockage device may comprise a head and fin similar to the parts 30A and 31A in the first example, FIG. 1A, or the fin may be modified according to FIGS. 5 and 6 or FIGS. 6 and 7. Alternatively, the closure fixture may have substantially the same outline as the block 10 viewed in FIG. 2 so that it closes the end of the channel 11 and slit 12 and fills the end of the space between the jaws 17 to provide the attenuating space 35.

I claim:
1. An extrusion die for extruding hot molten plastic downwards as a sheet, the die comprising in combination a block, there being formed in said block a longitudinal channel to receive the molten plastic and a deep narrow longitudinal slit extending from said channel to the underside of the block, said slit having a constricted mouth which determines the thickness of the sheet, a blockage device which is a precise fit within the channel and slit so as to form a complete end closure to the channel and slit except only that there is provided underneath said device a fine inter-jaw space which projects laterally beyond the otherwise completely closed end of the slit, and means underneath the blockage device defining an end to said space.

2. An extrusion die according to claim 1 also including, in combination, screw means mounted on an end of the block and extending into the longitudinal channel and a connection between said screw means and the blockage device within the channel and slit, said screw means being operable to adjust said device along the interior of said channel and slit to vary the width of the sheet.

3. An extrusion die for extruding hot molten plastic downwards as a sheet, the die comprising in combination a block, there being formed in said block a longitudinal channel to receive the molten plastic and a deep narrow longitudinal slit extending from said channel to the underside of the block, a pair of jaws secured to opposite sides of the block and having closely adjacent tips registering with said slit and defining a constricted mouth which determines the thickness of the sheet, a blockage device which is a precise fit within the channel and slit so as to form a complete end closure to the channel and slit, except only that there is provided underneath said device a fine inter-jaw space which projects laterally beyond the otherwise completely closed end of the slit, means between the jaw tips and blockage device defining an end to said space, and adjustment means mounted on the block and connected with the blockage device for adjusting said device together with said end-defining means lengthwise of the channel and slit to vary the width of the sheet.

4. An extrusion die for extruding hot molten plastic downwards as a sheet, the die comprising in combination a block, there being formed in said block a longitudinal channel to receive the molten plastic and a deep narrow longitudinal slit extending from said channel to the underside of the block, a pair of jaws secured to opposite sides of the block and having closely adjacent tips registering with said slit and defining a constricted mouth which determines the thickness of the sheet, a blockage device which is a precise fit within the channel and slit so as to form a complete end closure to the channel and slit except only that there is provided underneath said device a fine inter-jaw space which projects laterally beyond the otherwise completely closed end of the slit, means between the jaw tips and blockage device defining an end to said space, screw means mounted on an end of the block and extending into the longitudinal channel, and connections between said screw means on the one hand and the blockage device and the means defining an end to the inter-jaw space on the other hand, said screw means being operable to adjust said device and said end-defining means simultaneously to vary the sheet width, the means defining an end to the inter-jaw space being a member fitting along the bottom of the slit and resting upon the tips of the jaws, said member having an operative connection with the adjustment means.

5. An extrusion die for extruding hot molten plastic downwards as a sheet, the die comprising in combination a block with downwardly converging opposite sides, there being formed in said block a longitudinal cylindrical channel to receive the molten plastic and a deep narrow longitudinal slit defined by substantially parallel walls extending from said channel to the underside of the block, a pair of downwardly converging jaws secured to said sides of the block and having closely adjacent tips registering with said slit and defining a constricted mouth which determines the thickness of the sheet, a blockage device consisting of a cylindrical body and a dependent fin which are a precise fit within the channel and slit respectively so as to form a complete end closure to the channel and slit except only that there is provided underneath the fin a fine inter-jaw space which projects laterally beyond the otherwise completely closed end of the slit, means between the jaw tips and blockage device defining an end to said space, and adjustment means mounted on the block and connected with the cylindrical body for adjusting the blockage device together with said end-defining means lengthwise of the channel and slit to vary the width of the sheet.

6. An extrusion die according to claim 5 in which the underside of the fin is formed with a longitudinal groove and the means defining an end of the fine inter-jaw space is a member fitting along the bottom of the slit and resting upon the tips of the jaws, said groove being a neat fit upon said member.

7. An extrusion device according to claim 5 in which the fin bottom is formed with an incline defining a progressively diminishing entrance from the slit to the recess.

8. An extrusion device according to claim 5 in which the fin bottom is formed with a curve defining a gradually diminishing entrance from the slit to the recess.

References Cited in the file of this patent

UNITED STATES PATENTS

| | | |
|---|---|---|
| 2,300,211 | Eberlin | Oct. 27, 1942 |
| 2,712,155 | Nelson | July 5, 1955 |
| 2,859,475 | Thornberg | Nov. 11, 1958 |